April 22, 1969 R. P. NIQUETTE 3,440,630

DATA GAP PREDICTOR FOR MAGNETIC TAPE UNITS

Filed Jan. 8, 1965 Sheet 1 of 2

INVENTOR:
Reaman Paul Niquette
By Smyth, Roston & Pavitt
Attorneys

INVENTOR:
Reaman Paul Niquette

By Smyth, Roston & Pavitt
Attorneys

United States Patent Office 3,440,630

Patented Apr. 22, 1969

3,440,630

DATA GAP PREDICTOR FOR MAGNETIC TAPE UNITS

Reaman Paul Niquette, Palos Verdes Estates, Calif., assignor to Scientific Data Systems, Santa Monica, Calif., a corporation of Delaware Filed Jan. 8, 1965, Ser. No. 424,399
Int. Cl. G11b *5/78;* G11c *11/02*
U.S. Cl. 340—174.1 12 Claims

ABSTRACT OF THE DISCLOSURE

In a magnetic tape system with separated reading and recording transducers scanning the same track and a relatively leading record transducer in the read mode, the record transducer is operated for auxiliary reading for predicting occurrence of a data gap to control slow-down of the tape.

The present invention relates to improvements for data recording and reproducing systems, preferably of the type using magnetic tapes.

Modern data processing systems are usually equipped with magnetic tape units serving as permanent or temporary memory to store data for later use. The tape unit is usually equipped with magnetic reading and magnetic writing or recording transducers cooperating with electric circuit means controlling the data flow to and from the tape through these transducers whenever needed by or issued from the computer. These data are usually either permanently stored in the tape unit on the tape, or they are provided by the computer to the tape for temporary storage. In either case, the data are organized groups of binary type signals. These groups may also be called records and general format requirements call for distinguishable separation of the records whenever they appear, specifically such groups are provided or needed by the computer as a whole, during one particular subroutine and to the exclusion of other groups or records.

It is evident that it is necessary to separate the records on the tape by gaps. These gaps have to be so long that after a record has been read the tape can be stopped without encountering another record. Moreover, upon restarting the tape must have gained sufficient speed before the beginning of the next record enters the range of the reading transducer, because the interaction transducer-tape is a dynamic one requiring relative movement for induction of signals in the transducer.

It is clear, that (1) for a magnetic tape of given length, the total length of all gaps reduces the effective capacity of the tape to hold data; (2) the higher the tape speed, the longer it takes for the tape to stop, so that the length of each gap has to be selected larger in case of a higher tape speed; a given gap length sets an upper limit within the required distance from the next record; (3) scanning of a given number of records cannot be made faster simply by increasing the tape speed, because correspondingly larger gaps increase the total length of recorded tape to be scanned.

To improve tape units it is thus essential, that ways be found to shorten the gaps as much as possible, and that operating means are devised permitting normal operation at high tape speeds while keeping the gaps short without deterioration of versatility of performance.

One principle permitting the reduction of gap length is disclosed in a copending application by me and others, Ser. No. 410,591, now Patent No. 3,388,687, filed Nov. 12, 1964 having common assignee. The system disclosed in this copending application permits variable speed operation, in that the rate of data recording or reading is determined solely for the passage of fixed increments of tape and independent from tape speed; the gap is formed by metering a more or less fixed plurality of such similar increments. Such a system takes into account, that recording and reading of a tape though desirable to be conducted at high speeds does not require a constant speed; only minimum speed requirements are to be fulfilled to permit effective inductive coupling between transducer and tape. Thus, reading or recording may commence before the tape has gained full speed. This shortens the gap because in modern equipment, minimum tape speed and a high normal operation speed are apart by several orders of magnitude.

For computer compatible operation, it is not necessary that the data flow to or from the computer, from or to the tape be constant in time. The computer can furnish or receive data at any rate such as for example determined by the tape unit. This is an important aspect because it allows improvements in the tape unit without having to consider limitations set by computer speed or fixed rate requirements.

The present invention now is concerned with the possibility that it is also not necessary to maintain full tape speed up to the end of tape reading: The tape can be slowed down while reading is still in progress. Here the specific design of tape units have to be considered.

The transducers are usually arranged along the tape in that there first is a recording transducer (or a set of transducers inscribing parallel tracks) and, as far as relative movement between tape and transducers is concerned, the reading transducer or transducers trails the recording transducer(s) at a fixed distance therefrom. The reading transducers must trail since as is usual, a read-after-write check is conducted by the system to determine whether the record just made is correct.

After the last character of a record has been written, the tape can be slowed down even though the read-after-write check is still in progress. The length of the portion of the record still to be read is predictable, and it is merely necessary to ensure that there still is sufficient speed for the read head to be able to detect the last character. Specifically, when slow down proceeds after the last character has been written, the tape decelerates, but during this period when the tape traverses the known distance between read and write transducers, deceleration must not result in a speed below minimum read speed.

The tape will come to a stop in a position relative to the transducers, in which either transducer is much closer to the end of the record than it were in case slow down from the high speed commences only after completion of the read after write check. The interrecord gap is now formed by determining the distance from this stop position at which after restarting recording may commence. The shortest distance permissible here is that traversed by the tape after restarting and after having attained such a minimum speed which permits magnetic interaction between tape and transducers to make a recording which permits a suitable signal-to-noise ratio at subsequent readout.

These rules for forming a gap would be of no avail if one cannot stop the tape during a subsequent readout routine (not a read-after-write check but a completely separate reading routine), at the same or at least approximately the same position as the tape was stopped after recording of the first record mentioned. When a record is read, neither the computer, nor the read logic "knows" when the end of the record comes, so that the slow down from full speed could commence only at the end of reading. Now, the tape would surely stop at a distance in which the transducers are much farther away from the end of the record than they were in case of recording. However, use can be made of the facts that during tape reading the write transducer (1) of course leads as during recording, (2) does not provide any signal to the tape, but (3) still is magnetically coupled to the tape, so that in fact signals are induced into the write transducers. Though structural details of read and write transducers may differ, there is at least some electro-magnetic induction into the core-coil structure of the write transducers when tape bearing recordings passes the write transducer. This fact can be used for interrecord gap detection.

The write transducers will sense the end of the record before the read transducer does, since a data or interrecord gap on the tape amounts to an inductive decoupling of tape and unbiased transducer. Thus, by using the write transducer for such gap prediction, one can start to slow down the tape drive after the leading write transducer has passed over the end of a record, which is the same position at which it was when slow down was started during writing.

This tape slow down is best controlled by operatively coupling the write transducer to the tape advance control means. There usually is provide a servo loop for controlling the speed of the tape drive, which servo loop includes a source of reference signals, a tape or drive speed measuring device, an error signal formation circuit, and a tape advancing means such as a D.C. motor which controlled by the error signal in such a way that the system balances towards error minimum.

The gap predicting circuit coupled to the write transducer is used to control the source of reference signals, so that a high or the highest tape speed can be attained only when the write transducer senses: NO GAP, while a GAP causes slow down. Since the gap formation additionally has to consider that reverse tape reading is desirable at times, it is advisable to explain the invention, the problem solved and the objects of the invention with reference to the appended drawings in which:

FIGURE 1 illustrates schematically a block diagram of a magnetic tape recording and drive control system in accordance with the preferred embodiment of the invention;

FIGURE 2 illustrated schematically a record gap and several positions of a transducer assembly relative to the tape;

Figure 1:
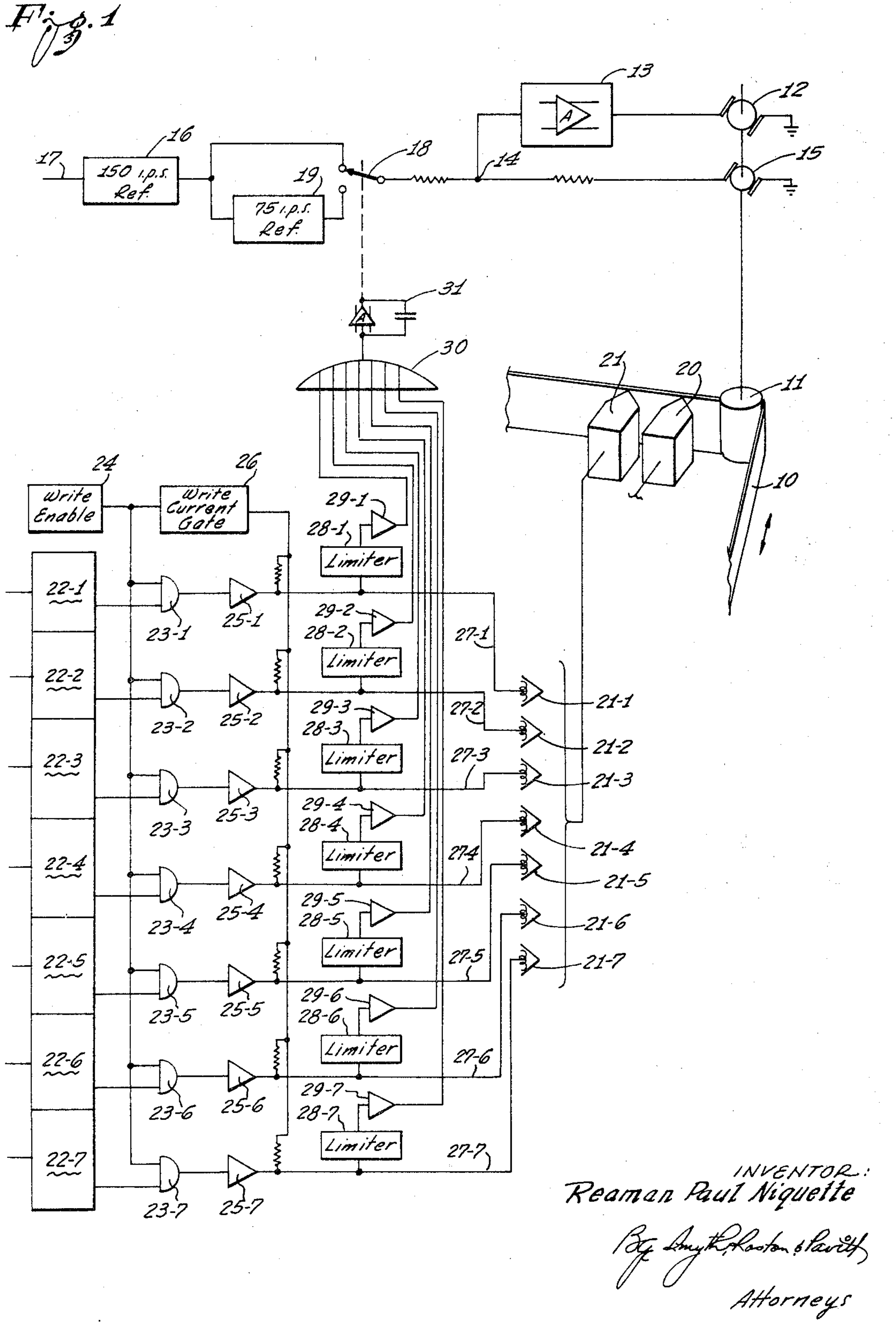

Proceeding now to the detailed description of the drawing, in FIGURE 1 thereof there is shown a portion of a tape transducing system in which the gap predicting system in accordance with the present invention will be used with advantage. There is first shown a magnetic tape 10, transported by a capstan 11 in preferably slippage-free, positive engagement therewith. The tape is advanced past a magnetic transducer head assembly comprising reading or reproducing transducers 20 and recording or writing transducers 21. It is assumed, that seven parallel tracks are recorded on the tape, so that there are seven reading and seven recording transducers respectively aligned across the direction of tape advance.

Capstan 11 is driven directly by a high torque, low inertia motor 12. The motor 12 is of the D.C. type and receives a controlled voltage from a regulating amplifier 13, the input terminal 14 of which receives an error signal produced by comparing the voltage from two sources. One signal voltage is derived from a D.C. tachometer 15 geared to motor 12 and rotating therewith. The tachometer output voltage is compared at terminal 14 with a voltage normally derived from a source 16 of reference potential furnishing a reference voltage. This reference voltage is constant to normal speed control, but preferably the reference voltage has a predetermined, characteristical waveform for causing motor 12 to start, and stop at a desired characteristic. The source of reference potential 16 thus may include a function generator providing an upwardly sloping ramp function for starting the motor, which ramp function then levels off for constant speed control, while for stopping a downwardly sloping ramp function is produced. Reference source generator 16 responds to command signals from a computer issuing signals into a line 17 for motor starting and stopping.

The reference voltage is applied to the terminal 14 via a switch 18 capable of assuming a second position, in which it disconnects source 16 from terminal 14 while connecting a second source of reference voltage 19 to the terminal 14. The source 10 derives its waveform also from generator 16 and thus furnishes it output likewise in response to a command signal in line 17.

It is characteristic for the present invention that for normal tape driving the source 16 establishes a constant reference voltage level which is representative of the normal, rated speed of motor 12 and capstan 11, so as to provide for a constant tape speed for normal tape recording or tape reading operations. The source 19 normally provides a constant reference voltage of a drastically reduced value and representing a considerable lower tape speed in comparison with the normal reference voltage furnished of unit 16. However, the tape reference voltage for such reduced tape speed should have a value which permits still tape reading and tape recording operations, i.e., the reference voltage from source 19 should not provide a value representative of such a low motor and tape speed which practically would decouple the magnetic tape from reading or recording transducers thereby resulting in a prohibitive signal to noise ratio.

The principal purpose of source 19 is to establish a different, i.e., lower reference level for the tape drive speed, while it is not necessary to duplicate ramp function generation for starting and stopping conditions. Thus, source 19 may comprise a limiter, duplicating the ramp function of generator 16 below limiter level. Specifically network 19 will provide 1:1 signal transmission below limiter threshold, but when this threshold is reached, network 19 provides a lower constant level as does source 16.

As an example, the source of reference potential 16 may furnish a reference value representing a tape speed of 150 inches per second, whereas the source 19 provides half the output voltage of source 16 so as to represent half the rated tape speed or 75 inches per second. Thus, independent from the position of switch 18, the motor 12 will start to run so as to drive capstan 11 and advance tape 10. When the output ramp of generator 16 has reached the 75 i.p.s. reference value, the output of network 19 levels off, while the ramp continues to rise until generator 16 levels off at the 150 i.p.s. reference value. The motor 18 will attain a controlled speed of either 150 or 75 inches per second, which depends on the position of switch 18 and either is maintained at the degree of accuracy attainable by the feedback loops 15, 14, 13.

The invention now is primarily concerned with the operation of switch 18. This, of course, is only to be understood symbolically, in that from a more general point of view, the invention is concerned with the control of motor 12 by establishing at times the large, rated tape speed reference, while causing reduction of the speed reference value during other specific periods of time.

Figure 2:
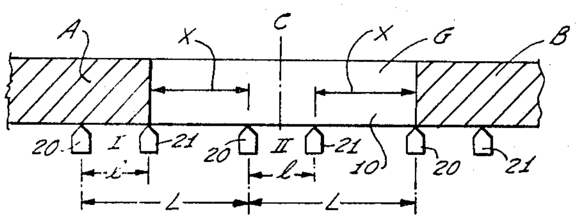

Before proceeding with the description of the circuit network incorporating the features of the invention, reference is made to the schematic and symbolic representation of FIGURE 2. There is shown the tape 10 having a first recording area A which contains a record comprised of recordings of data, preferably but not necessarily digital data and being recorded in the tape portion A in the required format, which by itself is also not of critical importance of the invention. Spaced apart from record A and along the extension of tape 10 there is another recording area B, and in between there is an interrecord gap G containing no data and duly separating the records A and B from each other.

In order to avoid misunderstanding, it is pointed out that areas A and B will be interpreted as records when reading operations are discussed and described, while areas A and B are interpreted as tape areas destined to receive recorings, i.e., to be recorded on, when writing operations are discussed. The main problem of interest can be stated now as follows. After a record A has been written, where to begin the recording of record B. The solution of this problem will be developed in the following:

The principal purpose of gap G is to permit distinction of records along the tape in such a manner that after, for example, the record A has been read, the tape can be stopped; this stopping position may be maintained indefinitely and until another tape operation is desired. For reading of the next record B, the tape will be restarted, and when the beginning of record B passes under the read transducers, the tape must have attained a speed which is sufficiently high to permit withdrawal of read signals from the tape reading transducer clearly above the critical signal to noise level. On the other hand, it is clear that any gap in between records constitutes a loss in available data space, thus reducing the capacity of the tape to hold data. These are opposing conditions.

As a different requirement for the length of the gap one has a consider that, for example, reading operations are to be carried out in either direction. For the moment, only starting or restarting conditions are to be considered. The stop position of, for example, the read transducer in between two records must be such that upon restarting in either direction the tape has attained minimum read speed before the read transducer passes over the respective beginning of the record to be read. This lends itself to the suggestion, that the stop position for the read head be in the center C of the gap, and the gap extends from this center in either direction for at least a distance equal to the travel distance of the tape after restarting for attaining minimum read speed.

However, read and write heads are structurally combined and these read and write or recording transducers are usually arranged along the extension of the tape at a fixed distance, such as $l$ from each other. Thus, there is an inherent asymmetry in the position of the transducers relative to the tape. Conventionally, forward movement is defined to exist as far as relative tape movement is concerned, when the reading transducer trails the recording transducer. This, of course, holds true regardless whether the tape recording results in a single track or in a multiple track wherein several tracks are being read or recorded simultaneously.

The requirements for sequencing of writing routines is similar to that of reading, i.e., after a record, for example A, has been written on the tape, the tape may have to be stopped because record B will be recorded at some later time. Thus, before record B is being written, the tape may have been stopped. Upon restarting one should not record immediately but the tape must have gained some speed before recording proper may commence.

Recording will not be carried out in the reverse direction of the tape, so that symmetry for the write transducer relative to the gap is not a point to consider. However, if the tape drive characteristics were such that the trailing read head always stops in the center between a gap, the leading write transducer might be too far ahead, and in case of recording the next record would be started to be written too early. Furthermore, it is to be considered, that there usually is a read after write check requiring the data just recorded to be read immediately subsequent to recording, to determine whether the record has ben written correctly.

Versatility of operation indicates further that after, for example, a record has been written, it must be possible and must be provided for, that the next operational step may require reverse reading but alternatively the writing of another record (i.e., B) may become necessary.

A compromise providing minimum gap under these circumstances is to be seen in placing the stop position of the tape so that the center C of the gap is in between the center of the reading and the writing transducers which position is shown by II in FIGURE 2.

Let $x$ be the distance of the reading head 20 from the end of the preceding record such as A in case of central stop position II. This is the same distance of the writing head 21 from the beginning of the next record area B. Distance $l$ is the variable factor in the gap the total length of which is, of course, $2x+l$. This distance $x$ must be at least large enough so that in case of restarting and after having traversed for the distance $x$, in case of reverse reading the tape head has obtained sufficient speed for the read transducer to be able to discern data. By definition this distance $x$ is the same as between recording transducer and the next record (B). Distance $x$ is sufficiently large so that in case of forward stating for continuing of recording the write head is able to start recording of the record B after having traversed distance $x$.

In case of high acceleration of the tape, it is not difficult to meet the minimum gap requirements, particularly since variable speed recording and reading is not impossible, and the gap could be small indeed, i.e., the distance $x$ could be very small if restarting conditions were the only requirement. This, however, is not the case; one has to consider additionally that the tape after, for example, a record has been read in forward or reverse direction, has full speed. The end of the record read, such as A is basically unknown during reading since the computer does not retain such information. Thus, the end of the record is being normally passed over by the read head 20 at full tape speed. After the end of the record has been monitored, by the read-out evaluation logic, the deceleration has to commence, and this is the critical point, since without undue overloading (heating) of the motor, the gap must have a length that indeed the read-write head assembly comes to a stop in the central position II as defined above. This enlarges the distance $x$ far beyond the value permissible if only minimum speed requirements for reading or writing were dictating the gap length.

For example, at a tape speed of 150 inches per second the length of the tape traversed even during fast deceleration down to full stop requires a considerable large amount of available gap than were necessary if only restarting conditions for gaining the above-mentioned minimum read and write speeds were the controlling factor. Such minimum read speed is only a few inches per second. The gap will have to be longer the higher the rated tape speed is, because the deceleration then lasts longer accordingly. Overall high speed reading and recording operation is essential, since by comparison a magnetic tape unit is considerably slower than other memory operations in the associated computer.

The above mentioned copending application includes suggestions according to which deceleration is selected faster than acceleration. This materially mitigates the problem, but still cannot result in similar distances of tape travel, one occurring at deceleration from full speed to full stop, the other occurring at minimum speed. Similar tape travel distance in either case would require an acceleration-deceleration ratio equal to the ratio of the square values of these two speeds, which is impossible to attain merely by temporarily overloading the motor.

The invention, however, is concerned with a method and system which permits an earlier slow down procedure than heretofore possible. As was mentioned briefly above, this is done by using in case of forward reading, the write head as record envelope detector simply detecting absence or presence of any data on the tape, and thus being able to detect the end of a record considerably earlier than the read head does.

Position I of the read-write transducer assembly as shown in FIGURE 2 occurs at the moment when the leading write head passes over the end of the record A in case of forward reading. At that time the read head is, of course, still over the record A, but the end of the record can be discovered if one monitors the signals induced into the write transducer from the tape. Thus, when the tape-transducer system passes through position I it is possible to initiate the slow down procedure for the tape.

If L is the distance the tape traverses from a slow down command to a complete stop position, this tape stopping distance L begins within the area of record A, i.e., at the distance $l$ from the end of the record A. The read-write transducer head assembly now can be stopped in the central position II in between the records A and B, even though the gap is very short, i.e., $X<L$. This position would not be attainable if a slow down procedure could not commence prior to the time when the trailing read head passed over the end of record A.

In order to control this slow down procedure by way of gap prediction or anticipation, the write transducer assembly 21 is connected as follows. It is assumed that the usual seven bit parallel character format is used, i.e., six bits for the character code and one bit for parity, so that there are provided seven write transducers as components of the write transducer assembly 21 and denoted with reference numeral 21–1 through 21–7. For purposes of recording, particularly for controlling of the recording, there is, first of all, provided an input register 22 comprised of seven register stages 22–1 through 22–7 such as flip-flops. The output signals of the seven flip-flop stages 22–1 through 22–7 are fed to the signal input terminals of seven gates 23–1 through 23–7 receiving as gating signals the output of a record enable biasing or gating signal source 24.

The network 24 is part of the write or recording control logic, and it furnishes a write enable signal upon issuance of a command from the computer, that writing indeed is desired, and this write enable signal is a continued signal which remains true for the period of time the computer operates the recording device in the recording mode. The seven outputs of the respective seven gates 23–1 through 23–7 are fed to amplifiers 25–1 through 25–7, individually providing sufficient gain for the binary signals drawn from the register 22 for purposes of providing sufficient power output for purposes of recording.

The return path of each amplifier is resistively coupled to a write current gate 26 which prevents any kind of current flow during the absence of a write enable signal; i.e., the write current gate 26 is in fact a control gate governing the return path of the amplifiers 25–1 through 25–7 in response of the write enable signal furnished from stage 24. Thus, the signal output terminals of amplifiers 25–1 through 25–7 will not furnish any output signals whatever, including noise, during periods of time other than the writing periods as defined by the presence of a write enable signal from source 24. As long as the write enable signal is not true, the output lines of amplifiers 25–1 through 25–7 are kept or may assume potentials that are independent from the write control circuit.

The output signals of amplifiers 25–1 through 25–7 are passed into signal lines 27–1 through 27–7 to directly feed the write transducers 21–1 through 21–7 respectively, for purposes of recording data in a parallel by bit format. During forward reading, no output stands on at the output side of any of the amplifiers 25–1 through 25–7, but these signal lines 27–1 through 27–7 are individually monitored as to any signal passively induced into the write heads 21–1 through 21–7. During reading this is indeed the case, since no recording and reading transducers are structurally very similar, and recording and reading may be inverse electromagnetic phenoma as far as the transducers are concerned.

Upon passage of the write transducer across tape containing a record, the induction is, qualitatively speaking, the same as resulting from passage of a read transducer over such a tape portion. Thus, during reading with no write enable signal standing on, signals will be induced into the write transducers and passed into the lines 27–1 through 27–7, which signals result directly from the passage of the otherwise unbiased write transducers over the magnetic tape and particularly over the record storing portions thereof.

These signals "read" by the write transducers are fed individually to limiter states 28–1 through 28–7, and are duly amplified by gap predictor preamplifiers 29–1 through 29–7. The output signals of amplifiers 29–1 through 29–7 are then fed to an "or" gate 30. It should be mentioned that actually the series connection of "or" gate and amplifiers can be an inverse one.

Since usually odd parity is used, there always is at least one bit per character. Thus, as long as there is a record proper underneath the transducers, there always will be at least one bit. It appears, therefore, that as long as the write transducer during reading passes over record storing tape portions, output signals will be fed to at least one output terminal of "or" gate 30 and from there to an integrator amplifier 31.

The integrating amplifier 31 has a recovery time larger than the distance (in time) bewteen characters on the tape when read at lowest read speed of the system. The amplifier 30 overbridges the pause in between succeeding characters on the tape of a record, and thus provides a D.C. output signal which is continued for the period of time that the write transducers pass over recorded tape portions at a speed sufficiently high to permit any discernible interaction between tape and transducers.

Figure 5:
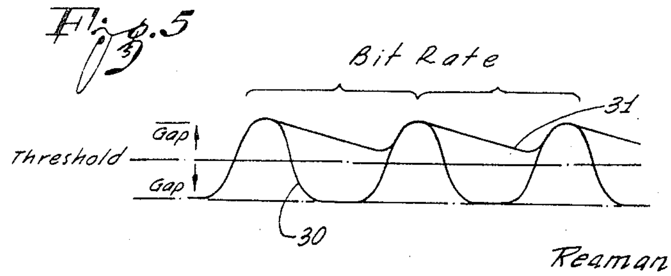
FIGURE 5 illustrates waveforms of signals within the system shown in FIGURE 4.

As soon as the write transducers pass over the end of the record, no more signals will be induced into the transducer so that no more bits are applied to "or" gate 30, and the output of amplifier 31 will drop to zero indicating existence of a gap. In order to avoid any uncertainty of signals, it is advisable to connect the output of amplifier 31 to a Schmitt trigger 32 operating in effect as a pulse shaper to provide GAP and $\overline{\text{GAP}}$ signals as voltages of constant amplitude and steep rising or dropping flanks (see FIGURE 3). The threshold value of response of the Schmitt trigger 32 is somewhat below the minimum of curve 31 in FIGURE 5, but well above the zero line to prevent any response due to noise in a data gap on the tape.

Thus, the output of Schmitt trigger 32 is either at a first level during passage of the write transducer over a record, i.e. during the absence of a gap, a signal $\overline{\text{GAP}}$ is furnished; the output signal of Schmitt trigger 32 is at a second level when there is an interrecord gap furnishing a signal GAP. Of course, there is a transition or delay period resulting from the integration, so that the changeovers GAP $\overline{\text{GAP}}$ do not occur instantaneously at the moment the write transducer pass a record border, and the delay corresponds roughly to the character spacing at low tape speeds.

This output of amplifier 31 is now used to control the switch 18. Of course switch 18 may, for example, be comprised of two gates **18*a* and 18*b* respectively (see FIGURE 3) connected to the output terminals of reference sources 16 and 19 and having joined outputs. Gate 18*a* is opened by a GAP signal, there being an inverter 33 connected to the output side of amplifier 31, while gate 18*b*** is opened by the $\overline{\text{GAP}}$ signal.

The system as described operates as follows. It shall be assumed that the read-write head assembly has the position as II in FIGURE 2. This position, of course, was attained while the write transducer heads passed over gap. Thus, no signals were induced in transducer 21. Any noise picked up by the transducer is suppressed in the amplifiers 29 which have a minimum response threshold. A GAP signal was and is furnished by amplifier 31 accordingly.

As long as the signal GAP is true, switch 18 connects the low speed reference source 19 to the servo loop for motor 12. The motor came to a stop and no signal is being developed by the reference source 19. Likewise, during stopping no signals are induced in the write transducers 21 so that the gap signal remains true.

Now another read operation is to be carried out; if the computer issues a command signal into line 17, both stages 16 and 19 are energized, but, of course, only stage 19 is at this moment effective directly, since only its output connects to terminal 14; the motor 12 will start. During the initial acceleration period, the absolute value of the reference signal for constant speed control is not of immediate importance, since any ramp function as provided by stage 16 is at the beginning of operation faithfully reproduced by the stage 19.

Even if no specific acceleration characteristics were provided for in stages 16 and 19, motor 12 will still be controlled for starting proper in that, for example, the amplifier 13 may then have a constant current output characteristic for as long as the error signal applied to and developed at terminal 14 exceeds a predetermined value. This is conventionally attainable by constant current control or saturation. This case, of course, arises during the initial starting period, since tachometer 15 provides only a very small signal so that regardless of the absolute instantaneous values of the reference sources 16 and 19 (or of switch 18) the motor 12 will start up rapidly and at saturation current or a constant controlled value of amplifier 13.

In any event, the motor 12 will start up at a predetermined starting control characteristic. It is immaterial for this phase of operation whether motor 12 assumes the rated speed as determined by low speed reference source 19 since reading proper is to be possible at that low speed. Soon the write head assembly 21 will enter for example record B, and pass over the beginning of record B. When the record border enters the range of the write transducers, an output is developed by "or" gate 30 in at least one of the lines 27–1 to 27–7, and as soon as amplifier 31 responds (there being a delay because of integration) the $\overline{\text{GAP}}$ signal becomes true, and switch 18 now connects reference source 16 for the higher speed to the servo loop for motor 12. The motor 12 will continue to be accelerated or will be accelerated again, until attaining maximum tape speed.

As long as the write head passes over the record the $\overline{\text{GAP}}$ signal remains true, and the motor speed is controlled in accordance with the high speed reference signal as provided by source 16. As soon as the write transducer head assembly passes over the end of this record, specifically the respective last character thereof, the "or" gate 30 ceases to provide a bit representing outputs, and integrator amplifier 31 runs down, so that the GAP signal becomes true as soon as the output of amplifier 31 drops below the threshold of Schmitt trigger 32, thereby causing a changeover by switch 18 to reconnect low speed reference source 19 to the servo loop of motor 12.

This reference changeover immediately causes the development of a large error signal in terminal 14, and the deceleration of motor 12 begins, while still reading is in progress. It is immaterial whether the servo loop regains another stable state for the low reference speed; the main point is, that while the read transducer still continues to read, a slowdown procedure commences, to reduce the tape transport from the very high speed of 150 inches per second.

As soon as the read transducer itself passes over the end of the record, it signals this fact to the computer, or the computer itself recognizes the fact that the last character on the record has been read, and provides a signal into command line 17, which in effect means that the tape transport has to be stopped completely. In this case it means that reference source 19 ceases to develop the reference signal, or passes a downward sloping ramp produced by generator 16 and the tape transport is now being slowed down from the relatively low speed of 75 inches per second to the full stop position which now can easily be attained at the central position II in FIGURE 2.

It can be seen that though not necessarily, but the same circuit is also operative during recording. Since, the limiter inputs for limiters 28–1 through 28–7 respond to the signal content in lines 27–1 through 27–7 regardless of what the source of the signal is, the $\overline{\text{GAP}}$ signal is developed by amplifier 31 also during recording proper, which is to be carried out at the high tape speed. Though, of course, the computer is aware of the fact when the end of a recording has been reached, the circuit illustrated and described can be used to control the slowdown of the tape at the end of recording. Since no more data are furnished any more for recording, the write enable signal becomes false.

Since during recording the write transducers are of course leading, these transducers will not pickup any signals. Thus, amplifier 31 develops a GAP signal, so that at that instance now during the recording routine, the GAP signal becomes true, and motor 12 is slowed down by causing the servo loop to respond to the lower reference signal from source 19. It should be mentioned that of course no immediate and complete slowdown at this point is desirable, because there is still a read after write check in progress, to be terminated only after the read head also has passed over the end of the record just written.

The sequence of events at the passage of the write and read transducers over the end of a record is thus the same for reading as well as recording, and the tape will stop after writing at a position defined by a distance from the record just written similar to the position to be attained later on when this record is being read.

For restarting for purposes of writing, at first reference source 19 is again effective, since still connected to terminal 14, GAP being true. As soon as data are being supplied for recording the "or" gate 30 responds again, so that amplifier 31 and trigger 32 change over to produce the $\overline{\text{GAP}}$ signal, and the high speed signal provided by reference source 16 becomes effective in the motor control circuit, at the very instant recording proper starts. The accurate metering of the desired gap length is disclosed in the copending application 410,591, now Patent No. 3,888,687, to me and others having common assignee (supra).

While for purpose of recording, the gap prediction or formation at any instance is strictly within the knowledge of the computer and could therefore be learned from the computer by developing proper signals, it is of advantage to provide the tape transport control unit with as many features as possible for autonomous operation so that the transport control becomes independent from the mode, i.e., reading or writing, so as to ensure similarity of performance of the transport at all times.

Figures 3, 4:
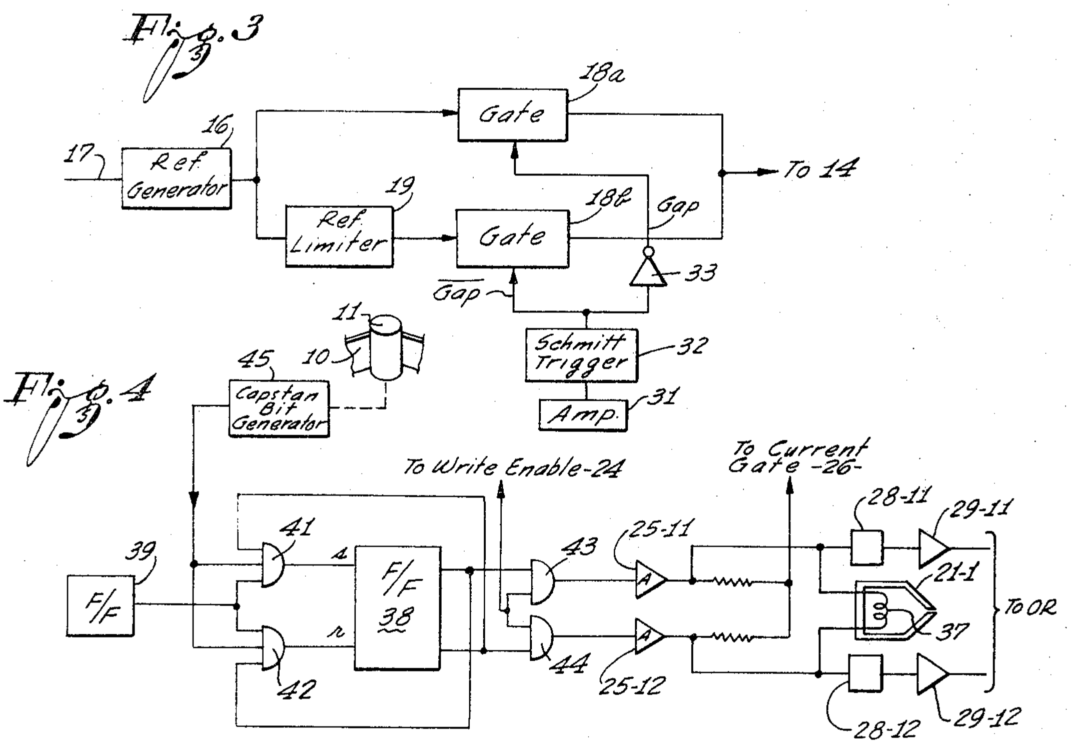
FIGURE 3 illustrates a block diagram of a detail of the system showing FIGURE 1.
FIGURE 4 illustrates a block diagram of recording control system for the NRZ1 recording method, and being equipped with an improvement in accordance with the invention.

Having explained the principle of the invention, brief reference should be made to implementation of a single channel, when using a particular type of recording that is conventional and very common. FIGURE 3 illustrates, for example, the recording transducer 21–1. It is assumed that the non-return-to-zero-change-at-ones recording method (NRZ1) is used. In this case the magnitization coil of the record transducer such as 37 always receives current as long as the write enabling signal is true, but current may flow in either one of the two opposite directions for bit value discrimination.

The write signal proper appears in the computer and in an output buffer stage 39 thereof. The buffer is clocked by system 45 metering the passage of fixed increments of tape independent from the tape speed such as disclosed in copending application 410,591, now Patent No. 3,388-687, supra.

The set side of output of flip-flop 39 controls a toggle flip-flop such as for example 38. The toggle flip-flop 38 is connected in that its set and reset input sides are governed by "and" gates 41 and 42 respectively receiving reset side and set side output signals of the flip flop 38. Gates 41 and 42 receive the set side output of flip-flop 39, which means that the gates 41 and 42 are both opened from the computer buffer, when binary quantity "1" is to be recorded, while gates 41 and 42 remain closed for the recording of a "0."

Writing proper is strobed, as was mentioned above, from a capstan bit generator 45 coupled to capstan 11. When tape 10 is slippage free coupled to the capstan, the sequence of bits derived from generator 45 defines the rate of data transfer to the tape in terms of fixed increments of tape as it progresses past the write transducers. Generator 45 may be a D.C. tachometer coupled to the capstan with a VCO connected to the tachometer output side, or the generator 45 may comprise a disk bearing reference markers effective in a stationary pickup; both types of configurations are disclosed in the above mentioned copending application.

Flip-flop 38 changes its state at any output pulse from generator 45 whenever there is a binary bit "1" provided by flip-flop 39, while for as long as there is bit value "0" in stage 39, the toggle flip-flop 38 does not change its state.

Set and reset output sides of the toggle flip-flop 38 are monitored by "and" gates 43 and 44 respectively receiving enabling signals from the enabling source 24 as afore-described. Thus, one of the two outputs of "and" gates 43 and 44 is always true during writing. Two driver amplifiers (in lieu of the single stage 25–1 of FIGURE 1) denoted here with reference numbers 25–11 and 25–12 are connected to gates 43 and 44 respectively, which amplifiers are resistively biased for current conduction from the write current gate 26, also as aforedescribed. During writing always one of the amplifiers 25–11 and 25–12 conducts.

The output sides of the amplifiers 25–11 and 25–12 are connected to opposite sides of the energizing coil 37 of transducer 21–1, so that the current direction through the coil 37 is determined by which one of the outputs of amplifiers 25–11 and 25–12 is true with the return path of course running through the write current gate 26.

There are additionally provided two limiter stages such as 28–11 and 28–12 respectively connected to opposite ends of coil 37 and having individually and permanently enabled current return paths. The amplifier stages 29–11 and 29–12 respectively connected to the limiter outputs provide and define a differential amplifier.

During reading of a "1" in the write transducer, always one of the amplifiers 29–11 and 29–12 will become true. The amplifiers 29–11 and 29–12 are alternatingly triggered by succeeding "ones," because the polarity of the voltage induced in coil 37 while passing over recordings is alternated in view of the NRZ1 recording method. Thus, for a seven track format, the "or" gate 30 should have in fact fourteen inputs, always one thereof being true with the recording transducers pass over a record. It is permissible to join directly the outputs of amplifiers 29–11 and 29–12 to provide a single output for each track, and here the above mentioned seven input "or" gates could be used.

All these considerations are of interest only in case of forward tape movement in which the read transducers travel the write transducers.

It is necessary to disable the operation of the gap predicting device during reverse tape movements, since here the shutdown or tape slowdown and deceleration should commence at the time when the now leading read head passes the end of the record, even though the recording or writer transducer still passes over a storing tape portion. In order to render the entire tape advance control responsive to this gap prediction device regardless of direction of tape movement, it is, of course, possible during reverse operations to connect effectively the inputs of limiters 28–1 through 28–7 to the tape reading transducers. The speed control then provided by this gap predicting circuit will be operated from the reading transducers in exactly the same manner as the write transducers control the tape movement during forward motion. This way complete symmetric can be attained permitting similarity of performance during tape starting and stopping in either direction.

The invention is not limited to the embodiments described above, but all changes and modifications thereof not constituting departures from the spirit and scope of the invention as intended to be covered by the following claims.

What is claimed is:

1. In a magnetic tape recording and reproducing system wherein data are provided to the tape through a recording transducer which data are organized in records separated from each other on the tape by a gap, and wherein data are provided from the tape to a reading transducer, with reading and recording transducers respectively scanning the same track and being spaced apart along the extension of the tape, the improvement comprising:

means for advancing the tape past said transducers with relative movement as between tape and transducers providing for trailing of the reading transducer and leading of the recording transducer;

means connected to said recording transducer to monitor reception of signals by said recording transducer during tape reading as conducted by said tape reading transducer as the spaced recording transducer and reading transducer pass over the same track, and providing signals respectively representing passage of said recording transducer over the gap or tape record;

and means responsive to said signal to control said tape advancing means at least for slowdown when the gap representing signal is provided by said monitoring means.

2. In a recording and reproducing system wherein data are provided to a movable storage means and through a recording transducer which data are organized in records to be separated from each other on the storage means by a gap, and wherein data are provided from the storage means to a reading transducer, with reading and recording transducers respectively scanning the same track and being spaced apart along the direction of movement of said storage means, at least said recording transducer interacting with said storage means permitting data flow in between transducer and storage means in either direction; the improvement comprising: means for advancing the storage means past said transducers with the relative movement as between storage means and transducers providing for trailing of the reading transducer and leading of the recording transducer;

means connected to said recording transducer to monitor development of signals in said recording transducer during reading as conducted by said reading transducer as the spaced recording transducer and reading transducer pass over the same track, and providing signals respectively representing passage of said recording transducer over gap or record;

and means responsive to said signal to control said advancing means at least for slowdown when the gap representing signal is provided by said monitoring means.

3. In a magnetic tape recording and reproducing system wherein data are provided to the tape through a recording transducer at a rate determined by the passage of fixed increments of tape past the transducer independent from the tape speed, which data are organized in records separated from each other on the tape by a gap, and wherein data are provided from the tape to a reading transducer, with reading and recording transducers respectively scanning the same track and being spaced apart along the extension of the tape, the improvement comprising:

means for advancing the tape past said transducers with the relative movement as between tape and transducers providing for trailing of the reading transducer and leading of the recording transducer;

means connected to said recording transducer to be responsive to signals developed in said recording transducer above noise level as the spaced recording transducer and reading transducer pass over the same track, and providing signals respectively representing passage of said recording transducer over gap or tape record;

and means responsive to said signal to control said tape advancing means at least for slowdown when the gap representing signal is provided by said monitoring means.

4. In a magnetic tape recording and reproducing system wherein data are provided to the tape through a recording transducer and at a rate determined by the passage of fixed increments of tape past the transducer independent from the tape speed, which data are organized in records separated from each other on the tape by a gap, and wherein data are provided from the tape to a reading transducer, with reading and recording transducers respectively scanning the same track and being spaced apart along the extension of the tape, the improvement comprising:

control means for advancing the tape past said transducers with the relative movement as between tape and transducers providing for trailing of the reading transducer and leading of the recording transducer, said control means including circuit means for maintaining a relatively high tape speed;

means connected to said recording transducer to be responsive to signals developed in said recording transducer during passage of tape under said recording transducer as the spaced recording transducer and reading transducer pass over the same track, and providing signals respectively representing passage of said recording transducer over the gap or tape record;

and means responsive to said signals to control said circuit means at least for slowdown when the gap representing signal is provided by said monitoring means.

5. In a magnetic tape recording and reproducing system wherein data are provided to the tape through a recording transducer which data are organized in records separated from each other on the tape by gaps and wherein data are provided from the tape to a reading transducer, with reading and recording transducers respectively scanning the same track and being spaced apart along the extension of the tape, the improvement comprising:

means for advancing the tape past said transducers with the relative movement as between tape and transducers providing for trailing of the reading transducer and leading of the recording transducer;

first control means for said tape advancing means including a source of reference potential for normally providing control of said advancing means to advance said tape at a relatively high speed;

means connecting to said recording transducer to monitor passage of said recording transducer over recordings or gaps as the spaced recording transducer and reading transducer pass over the same track, and providing signals representative respectively of passage of the recording transducer over recordings or gaps;

and second control means for reducing the reference value as provided in said first control means when a gap signal is encountered.

6. In a magnetic tape recording and reproducing system wherein data are provided to the tape through a recording transducer which data are organized in records separated from each other on the tape by gaps and wherein data are provided from the tape to a reading transducer, with reading and recording transducers being spaced apart along the extension of the tape, the improvement comprising:

means for advancing the tape past said transducers with the relative movement as between tape and transducers providing for trailing of the reading transducer and leading of the recording transducer;

means connected to said recording transducer to monitor induction of signals into said recording transducer during reading as conducted by said tape reading transducer and providing a first signal representing passage of said recording transducer over a gap while providing a second signal representing passage of said recording transducer over tape records;

first control means connected to said monitoring means for controlling said tape advance means to attain a first, relatively low speed when said first signal is developed by said monitoring means;

and second control means also connected to said monitoring means for controlling said tape advance means to attain a relatively high speed for as long as said monitoring means develops said second signal.

7. In a magnetic tape recording and reproducing system wherein data are provided to the tape through a recording transducer which data are organized in records separated from each other on the tape by gaps and wherein data are provided from the tape to a reading transducer, with reading and recording transducers being spaced apart along the extension of the tape, the improvement comprising:

means for advancing the tape past said transducers with the relative movement as between tape and transducers providing for trailing of the reading transducer and leading of the recording transducer;

means for controlling said advancing means in accordance with a predetermined characteristic including means for maintaining a relatively high tape speed;

means connected to said recording transducer to monitor induction of signals into said recording transducer during tape reading as conducted by said tape reading transducer and providing a gap signal representing passage of said recording transducer over gap, while said gap signal is not produced when said recording transducer passes over tape records;

and signal means responsive to said gap signal and controlling said control means to prevent maintaining of said high speed in the presence of said gap signal.

8. In a magnetic tape recording and reproducing system wherein data are provided to the tape through a recording transducer which data are organized in records separated from each other on the tape by gaps and wherein data are provided from the tape to a reading transducer, with reading and recording transducers being spaced apart along the extension of the tape, the improvement comprising:

means for advancing the tape past said transducers with the relative movement as between tape and transducers providing for trailing of the reading transducer and leading of the recording transducer;

means connected to said recording transducer to monitor reception of signals by said recording transducer during tape reading as conducted by said tape reading transducer, providing a gap signal as long as said recording transducer passes over gap;

control means for said advancing means to maintain a relatively high speed of said tape;

and circuit means responsive to said gap signal to override said control means for slowing down of said advancing means.

9. In a magnetic tape recording and reproducing system wherein data are provided to the tape through a recording transducer which data are organized in records separated from each other on the tape by gaps and wherein data are provided from the tape to a reading transducer, with reading and recording transducers being spaced apart along the extension of the tape, the improvement comprising:

means for advancing the tape past said transducers with the relative movement as between tape and transducers providing for trailing of the reading transducer and leading of the recording transducer;

means connected to said recording transducer to monitor reception of signals by said recording transducer during tape reading as conducted by said tape reading transducer and providing a signal representing passage of said recording transducer over gap;

first control means responsive to an externally produced signal for advancing means to assume a relatively high speed;

and second control means responsive to said gap signal to reduce the speed of said tape advancing means.

10. In a magnetic tape recording and reproducing system wherein data are provided to the tape through a recording transducer which data are organized in records separated from each other on the tape by gaps and wherein data are provided from the tape to a reading transducer, with reading and recording transducers being spaced apart along the extension of the tape, the improvement comprising:

means for advancing the tape past said transducers with the relative movement as between tape and transducers providing for trailing of the reading transducer and leading of the recording transducer;

signal means for controlling said advancing means in accordance with a predetermined characteristic including means for maintaining a relatively high tape speed; and means connected to said recording transducer to monitor reception of signals by said recording transducer during tape reading as conducted by said tape reading transducer and providing output signals to said signal means for controlling said characteristics in response to passage of said recording transducer over gap or tape records.

11. In a magnetic tape recording and reproducing system wherein data are provided to the tape through a recording transducer which data are organized in records separated from each other on the tape by gaps and wherein data are provided from the tape to a reading transducer, with reading and recording transducers being spaced apart along the extension of the tape, the improvement comprising:

means for advancing the tape past said transducers with the relative movement as between tape and transducers providing for trailing of the reading transducer and leading of the recording transducer;

electric circuit means including speed measuring means and a source of reference signals for controlling said advancing means for maintaining a tape speed as set by said reference signals;

first means connected to said recording transducer to monitor induction of signals into said recording transducer during tape reading as conducted by said tape reading transducer and providing signals respectively representing passage of said recording transducer over gap on tape records; and second signal means for controlling said source of reference signals in response to said signals produced by said first signal means.

12. In a magnetic tape recording and reproducing system wherein data are provided to the tape through a plurality of recording transducers to inscribe a plurality of parallel tracks on the tape, such data being organized in records separated from each other on the tape by gaps, and wherein data are provided from the tape to a plurality of reading transducers, with the plurality of reading and recording transducers being spaced apart along the extension of the tape, the improvement comprising:

means for advancing the tape past said transducers with the relative movement as between tape and transducers providing for respective trailing of the reading transducers and leading of the recording transducers along each track;

means connected to said plurality of recording transducers to monitor induction of signals into any of said recording transducers during tape reading as conducted by said tape reading transducers, and providing a gap signal representing passage of said recording transducers over gap, while said gap signal is not produced when said recording transducers pass over tape records; and means responsive to said gap signal to control said tape advancing means to a relatively low speed, while absence of said gap signal permits said tape advancing means to run at a relatively high speed.

References Cited

UNITED STATES PATENTS 2,913,707 11/1959 Goldberg et al. ----- 340—174.1

BERNARD KONICK, *Primary Examiner.*

BARRY L. HALEY, *Assistant Examiner.*

U.S. Cl. X.R.

179—100.2